H. J. RICHTER.
AUTOMATIC SPRAY VALVE.
APPLICATION FILED APR. 28, 1909.
945,867.
Patented Jan. 11, 1910.
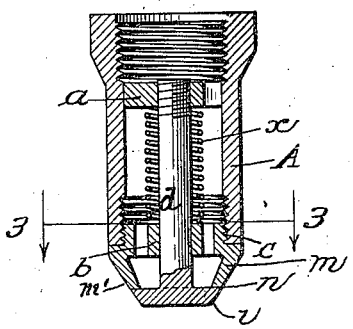
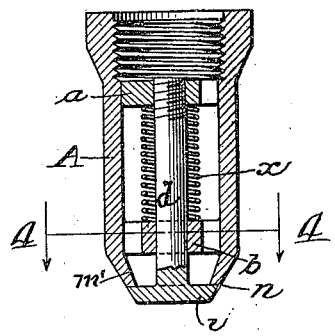
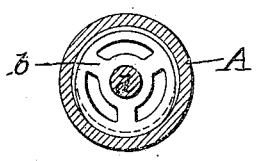
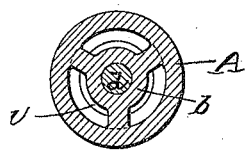
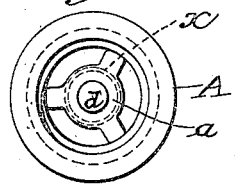
Witnesses:—
Chas. H. Yagle.
M Sullivan
Inventor:
Harry J. Richter.
by Wm Zimmerman
Atty.

UNITED STATES PATENT OFFICE.

HARRY J. RICHTER, OF CHICAGO, ILLINOIS.

AUTOMATIC SPRAY-VALVE.

945,867.

Specification of Letters Patent.  Patented Jan. 11, 1910.

Application filed April 28, 1909. Serial No. 492,785.

*To all whom it may concern:*

Be it known that I, HARRY J. RICHTER, a citizen of the United States, residing in Chicago, in the county of Cook and State of Illinois, have invented certain new and useful Improvements in Automatic Spray-Valves, of which the following is a full and correct specification, reference being had to the hereto accompanying sheet of drawings, forming a part hereof, and in which—

Figure 1 is a central longitudinal section, except a part of a central element shown in perspective. Fig. 2 shows Fig. 1 in a slightly modified form. Fig. 3 is a transverse section taken on the cutting plane 3 3 of Fig. 1. Fig. 4 is a transverse section of Fig. 2 taken on the cutting plane $a$ $a$ of Fig. 2. Fig. 5 shows Figs. 1 and 2 in plan view.

Like reference letters denote like parts throughout.

The object of my invention is to produce a low-priced and effective automatically acting spray-valve. To attain said desirable end I construct my said device in substantially the following manner, namely: I make a nozzle-holding, cylindrically bored, shell A adapted to be screwed onto a pipe. Said shell is provided with a coned nozzle-end $m'$ of which the nozzle-mouth forms a valve-seat $n$, and on said valve-seat is held a valve $v$ which is provided with a long cylindrical stem $d$ and for easier and more perfect construction of said shell and the nozzle the shell is screw-threaded, internally, at each end and into its discharging end is screwed a nozzle-piece $m$ provided with a shouldered and screw-threaded neck $c$ attached to the shell A, and within said neck is a valve-stem guide $b$ provided with radial arms extending to and integral with said neck. The free end of said valve-stem $d$ is screw-threaded into a radially armed nut $a$ whose arms play freely in the smooth-bored cylinder A and, thereby, form another guide for said valve-stem; and on said guide $b$ stands a spiral expansion or compressible spring $x$ which surrounds said valve-stem and pushes up the nut $a$ and thus seats the valve $v$ and holds it closed until adjusted resisting strength is overcome by an outward pressure within said shell A, to which it yields gradually and then lets out a thin umbrella-like film of water.

In Fig. 2 the lower and fixed valve-stem guide $b$ is integral with the shell A.

What I claim is:

1. The combination with a cylindrically bored shell provided with a conically tapered valve-seated nozzle-end, a valve-stem guide at the base of said nozzle, of a valve, an end-threaded valve-stem a radially armed nut on said stem, and a spiral spring between said guide and nut said radial arms forming movable guides for the valve-stem.

2. The combination with a cylindrically bored shell provided with a conically tapered, valve-seated, shouldered and threaded nozzle-end having a valve-stem guide, of a valve, an end-threaded valve-stem, a radially armed nut on said stem, and a spiral spring between said guide and nut, said radial arms forming movable guides for the valve-stem.

3. The combination with a cylindrically bored shell provided with a valve-seated nozzle-end, said nozzle tapered toward a centrally placed valve-stem, a valve-stem guide at the base of said nozzle, of a valve, an end-threaded valve-stem, a radially armed nut on said stem and a spiral spring between said guide and nut.

HARRY J. RICHTER.

Witnesses:
WM. ZIMMERMAN,
E. D. WAHL.